(12) United States Patent
Bowe et al.

(10) Patent No.: US 8,722,149 B2
(45) Date of Patent: May 13, 2014

(54) OPAQUE WET, SEE-THROUGH WEATHER-RESISTIVE BARRIERS AND METHODS FOR MAKING

(71) Applicant: Rohm and Haas Company, Philadelphia, PA (US)

(72) Inventors: Michael Damian Bowe, Doylestown, PA (US); Janah Cecelia Szewczyk, Philadelphia, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/758,256

(22) Filed: Feb. 4, 2013

(65) Prior Publication Data

US 2013/0149456 A1 Jun. 13, 2013

Related U.S. Application Data

(62) Division of application No. 12/963,778, filed on Dec. 9, 2010, now abandoned.

(60) Provisional application No. 61/284,750, filed on Dec. 22, 2009.

(51) Int. Cl.
*C09D 5/00* (2006.01)

(52) U.S. Cl.
USPC .................. 427/393; 427/385.5; 427/393.6

(58) Field of Classification Search
None
See application file for complete search history.

(56) References Cited

U.S. PATENT DOCUMENTS

| | | | |
|---|---|---|---|
| 4,194,955 | A | 3/1980 | Nowak et al. |
| 6,284,077 | B1 | 9/2001 | Lucas et al. |
| 7,285,320 | B2 | 10/2007 | Nigam |
| 2008/0138142 | A1 | 6/2008 | Pressman |

FOREIGN PATENT DOCUMENTS

| | | |
|---|---|---|
| EP | 1538187 A1 | 6/2005 |
| JP | 2000038540 A | 2/2000 |

OTHER PUBLICATIONS

Technical Data Sheet for Flexbond 325 from Ashland Inc., Jan. 2009.*
Dryvit Systems Inc., D5806 Backstop®NT™ for Use Beneath Claddings Other Than Dryvit® EIFS West Warwick, RI, Aug. 26, 2009, pp. 1-4.
Color is the Key in Self-Inspecting Coatings, JPCL, Feb. 2008, pp. 19-21.
Ding et al., "Film Formation from Pigmented Latex Systems: Mechanical and Surface Properties of Ground Calcium Carbonate/Functionalized Poly(n-butyl methacrylate-co-n-butyl acrylate) Latex Blend Films," Journal of Applied Polymer Science, vol. 100, 2006, pp. 4550-4560.
Laudone et al., "Effect of Latex Volumetric Concentration on Void Structure, Particle Packing, and Effective Particle Size Distribution in a Pigmented Paper Coating Layer," Ind. Eng. Chem. Res., 2006, vol. 45, pp. 1918-1923.
Glidden Porch and Floor 1-Gallon Satin Latex Paint PF7016N-01 at the Home Depot. (Jun. 25, 2012).
Glidden Porch & Floor Exterior Latex Satin Material Safety Data Sheet, (Aug. 31, 2007).

* cited by examiner

*Primary Examiner* — Vu A Nguyen
(74) *Attorney, Agent, or Firm* — Andrew E. C. Merriam

(57) ABSTRACT

The present invention provides aqueous self-inspecting wet coatings or films that dry to form translucent to clear weather-resistive barriers on a substrate, preferably a building substrate such as sheathing. The coatings comprise, as a wet film, one or more aqueous emulsion or dispersion polymer that can form a film in use conditions and less than 6% pigment volume concentration (% PVC), of one or more opacifier, one or more extender in amounts up to critical % pigment volume concentration (CPVC), optionally, one or more pigment, and substantially no void, hollow core, or hollow sphere containing pigment. The coatings or films enable one to apply the correct amount of coating to make a weather barrier that dries to a see-through coating or film.

9 Claims, No Drawings

OPAQUE WET, SEE-THROUGH WEATHER-RESISTIVE BARRIERS AND METHODS FOR MAKING

The present invention relates to self-inspecting coatings made from aqueous emulsion or dispersion polymers and that, when dry, provide a weather-resistive barrier the user can see through to a coated substrate. More particularly, it relates to self-inspecting wet coatings, i.e. that are opaque when wet if they are applied to a thickness adequate to protect a substrate from the elements, that form a translucent to clear coating when dry, wherein the coatings comprise one or more aqueous emulsion polymer coating compositions comprising extenders up to critical % pigment volume concentration (CPVC), less than 6% PVC, preferably, 4% PVC or less of one or more opacifier, optionally, other pigments, and substantially no void or hollow sphere containing pigment, as well as to coated building substrates and to methods for making the coatings.

Buildings are commonly constructed with exterior wood, cement or gypsum-based sheets or panels, such as sheathing, that can be overlaid with facades or cladding like wood, aluminum or vinyl siding, or which can be overlaid with cement finishes, e.g. EIFS. Because there are gaps between sheathing panels, flexible sheeting material (e.g., Tyvek from DuPont, felt or tar paper) can be nailed or stapled to the construction sheathing to protect the building from the elements before the cladding is mounted. However, such sheeting material is not a very good wind or water barrier and its application is labor intensive because the sheeting material must be unrolled and stretched over the area to be covered, then nailed or stapled into place.

More recently, liquid coatings have been proposed for the exterior cladding. Such coatings provide a good weather barrier. However, the existing versions of such coatings have been used to hide the panels underneath and they are opaque at almost any applied thickness. As a result, it is very difficult to know how thick to apply the coatings and there is a large risk of under- or over application. Further, such coatings obscure the visual or functional features of the building panel substrates, including lines stenciled thereon, structural features such as the locations of nails or screws, the alignment of the building panels, the location of the underlying building frame, e.g. studs and joists, and logos.

U.S. Patent Publication no. 2008/0138142, to Pressman, discloses an aqueous based paintable, peelable masking liquid for coating glass, e.g. windows, during the painting of window frames. The aqueous liquid can be a latex paint and can form a masking film that is opaque green when wet, drying then to a translucent blue. Pressman fails to disclose any weatherable coating or film and fails to disclose any composition or coating that when applied provides an indication that enough of the coating has been applied.

The present invention seek to solve the problem of providing coatings and coating compositions for use in making weather barriers for buildings that enable the user to see any marking on or feature of the building substrates once the barrier is dry and that enable the user to easily know if she has applied enough of the composition to the building substrate to form a weather barrier.

According to the present invention, self-inspecting wet coatings or films that dry to make a translucent to clear weather-resistive barrier comprise compositions applied to a substrate, the applied compositions comprising a composition applied to a substrate of one or more aqueous emulsion or dispersion polymer that can form a film in use conditions, less than 6% pigment volume concentration (% PVC), preferably, 4% PVC or less of one or more opacifier, one or more extender in amounts to give a coating having up to critical % pigment volume concentration (CPVC), preferably, up to 45% PVC, optionally, one or more pigment, and substantially no void, hollow core, or hollow sphere containing pigment, the compositions applied to a substrate. Compositions applied to make such coatings or films may consist essentially of the emulsion or dispersion polymer, pigment, extender and/or opacifier and any additives.

In one embodiment, the self-inspecting aqueous coatings of the present invention comprise one or more emulsion or dispersion polymer having a glass transition temperature (Tg) of 35° C. or lower, preferably, 25° C. or lower.

In another embodiment, the emulsion or dispersion polymer has a weight average particle size of from 20 to 500 nm, preferably 160 nm or more or, preferably, 400 nm or less. In this embodiment, when the emulsion or dispersion polymer has a weight average particle size of 100 nm or less, the composition has a % pigment volume concentration (% PVC) of 10 to 50, preferably, 20 or more to insure sufficient wet hiding without over application of the coating.

In another embodiment, the self-inspecting wet aqueous coatings comprise an opaque film at a thickness ranging from 100 μm to 1800 μm, preferably, from 350 μm to 1250 μm, or, more preferably, from 500 to 800 μm.

In yet another embodiment, the self-inspecting aqueous coatings comprise up to 2% PVC, preferably, from 0.01 to 1% PVC, of one or more colorant, such as an organic colorant or dye, so as to provide a tinted wet and dry film.

In yet another embodiment, the weather-resistive barriers comprise a dry coating made from the self-inspecting aqueous coating, which dry coating may have a dry film thickness from 50 μm or more or up to 1200 μm, preferably, from 100 μm or more or up to 750 μm.

In addition, coatings on building substrates are provided. Coated substrates may include, for example, wood sheathing, such as oriented strand board (OSB) or plywood, gypsum sheathing, cement sheathing, foam sheathing, masonry, such as basement walls or cinder block walls, wood roofing, flooring or subflooring. In one such embodiment, the coated substrates can comprise foam sealed sheathing.

Compositions for making the aqueous self-inspecting coatings comprise one or more emulsion or dispersion polymer and the amount of one or more extender and limited amounts of pigment, colorant and/or opacifier to make a film having the % PVC of the present invention. In one embodiment of the present invention, such aqueous coating compositions comprise one or more colorant and from 30 to 72 wt. % solids, wherein solids include polymer, pigment, extender, opacifier, colorant and any other additive which does not evaporate out of the coating as it dries.

According to the present invention, methods of making a weather-resistive barrier film comprise applying self-inspecting aqueous coating compositions comprising one or more emulsion or dispersion polymer to a building substrate until the substrate is no longer visible to make the wet coating or film of the present invention, and drying. Such applying can comprise applying to match the opacity of a sample that indicates the proper target opacity for the wet coating or film.

In another embodiment, the methods further comprise applying a foamed aqueous composition of an emulsion or dispersion polymer with a Tg less than 25° C., a surfactant, water and a blowing agent to any gaps within the building substrate prior to applying the coating composition to the substrate. Preferably, the foamed composition can be compressed when dried to a thickness of not more than 3 mm under a stress of no more than 0.035 MPa.

In the methods of the present invention, the foamed compositions and the self-inspecting aqueous coating compositions can comprise the same one or more polymer.

Still further, the methods may further comprise installing a decorative cladding over the coated sheathing, such as vinyl siding.

All ranges recited are inclusive and combinable. For example, a disclosed % PVC of 10 to 50, preferably 20 or more or, preferably, 40 or less or, more preferably, 45 or less, would include a % PVC of from 10 to 50, from 10 to 20, from 10 to 40, from 20 to 50, from 20 to 40, from 40 to 50, from 10 to 45, from 20 to 45, from 40 to 45 and from 45 to 50.

Unless otherwise indicated, all temperature and pressure units are room temperature and standard pressure.

All phrases comprising parentheses denote either or both of the included parenthetical matter and its absence. For example, the phrase "(meth)acrylate" includes, in the alternative, acrylate and methacrylate.

As used herein, the term critical % pigment volume concentration (CPVC) means a concentration of pigment, extender (or filler) and opacifier such that the polymer binder no longer fully coats or continuously binds the non-binder component of a coating (extenders, fillers, pigments &etc) and the resulting coating contains air voids As used herein, the term "(meth)acrylate" means acrylate, methacrylate, and mixtures thereof and the term "(meth) acrylic" used herein means acrylic, methacrylic, and mixtures thereof.

As used herein, the term "pigment volume concentration" or % PVC refers to the quantity calculated by the following formula:

$$PVC(\%) = \frac{(\text{volume of pigment(s)} + \text{volume extender(s)} + \textit{volume of opacifiers})}{\text{Total dry volume of coating}} \times 100$$

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

Glass transition temperature" or "Tg" means the mid-point glass transition temperature of a polymer as determined by differential scanning calorimetry (DSC"), in accordance with ASTM E-1356-91 where samples are run on a TA Instruments Q-1000 DSC at a ramp rate of between 10° to 20° C./min., in a nitrogen atmosphere, from −90° C. to 150° C. (twice). The midpoint inflection was taken from the second heating.

As used herein, unless otherwise indicated, the term "calculated Tg" or "glass transition temperature" refers to the Tg of a polymer calculated by using the Fox equation (T. G. Fox, Bull. Am. Physics Soc., Volume 1, Issue No. 3, page 123 (1956).

As used herein, the term "opaque" and the concept of full hiding of the substrate are used interchangeably.

As used herein, the term "self-inspecting" coating means a coating composition that changes from translucent or "see-through" to opaque when applied to a minimum wet film thickness that will provide a weather-resistive barrier.

As used herein, the term "substantially no void, hollow core or hollow sphere containing pigment" means that no such pigment is added to a coating composition and that the wet coating comprises 0.1% PVC of any such pigment.

As used herein, unless otherwise indicated, the term "weight average particle size" means the particle size as determined by light scattering (LS) using a BI-90 particle size analyzer, Brookhaven Instruments Corp. (Holtsville, N.Y.).

As used herein, the term "weight average molecular weight" refers to the weight average molecular weight as measured by aqueous gel permeation chromatography (GPC) against a polyacrylic acid (PAA) standard of a copolymer that is hydrolyzed in KOH.

As used herein, the phrase "wt. %" stands for weight percent.

The present inventors have found that wet aqueous coatings from compositions comprising emulsion or dispersion polymers and having a 6% PVC or less of one or more opacifier can provide self-inspecting coatings that enable one to apply only the amount of coating needed to make a weather-resistive barrier, so as to prevent waste, while at the same time drying to a translucent to clear weather-resistive barrier. Accordingly, the weather-resistive barrier can be applied to building substrates so that one can see the building substrate after application and thereby see the logos, the marks indicating the location of studs, or nail patterns in a building exterior. In addition, where wood, foam, cement or gypsum exterior sheathing is placed on a structural frame, one can see any gaps between the sheathing sheets. Accordingly, the weather-resistive barrier of the present invention fully enables the optimal placement of objects over the weather-resistive barrier for mechanical or spatial alignment purposes, e.g. decorative cladding and exterior trim, external fans or electrical boxes. In addition, the weather-resistive barrier of the present invention enables one to see the logos of makers of the sheathing or building frame materials, if desired, until the building is finished.

The wet self-inspecting coatings comprise one or more emulsion polymer suitable for making a weather-resistive barrier. The emulsion polymer can be any that is weatherable and which forms a film in use conditions. Preferably, the emulsion polymer is an acrylic polymer or copolymer. Hollow void, hollow core or hollow sphere containing pigments do not hide a substrate in a wet film, but will dry to form an opaque film even if the wet applied film is not fully opaque. Accordingly, use of hollow void, hollow core or hollow sphere containing pigments should be avoided.

Wet applied self-inspecting coatings made solely from emulsion polymers will dry clear to translucent if applied as a wet coating just until the wet coating fully hides the substrate. If pigments or extenders are included in the wet self-inspecting coating film, and especially if any opacifier is included, the wet applied thickness which gives the onset of full hiding or opacity will decrease accordingly.

Suitable emulsion polymers have a glass transition temperature (Tg) of 35° C. or lower, preferably, 25° C. or lower. As is known in the art, use of one or more coalescing solvent will aid film formation of any emulsion polymer having a Tg higher than use temperature. Preferably, to insure adequate durability of the weather-resistive barrier, the emulsion polymers have a Tg of −10° C. or more.

Suitable emulsion polymers have a weight average particle size of from 20 to 500 nm, preferably, 100 nm or more or, preferably, 400 nm or less, or more preferably 150 to 350 nm The thickness at which a wet applied self-inspecting aqueous coating becomes opaque is lowest for emulsion polymers having a weight average particle size of 150 to 350 nm, such that a wet film of the emulsion polymer alone is opaque at a thickness of from 350 to 800 μm. A weight average particle size above 100 nm and below 500 nm enables better hiding in a wet applied coating, such that the emulsion polymer alone will provide an opaque wet film at a thickness of 1350 μm or below. Emulsion polymers having a weight average particle size below 100 nm provide less efficient hiding when wet. Emulsion polymers having a weight average particle size above 500 nm may be subject to sedimentation and instability in use.

In one embodiment, when the emulsion polymers have a weight average particle size of 100 nm or less, the wet applied self-inspecting coating has a % PVC of 10 to 50, preferably, 20 or more, to insure sufficient wet hiding without over application of the coating.

In general, where the wet applied self-inspecting coatings comprise one or more extender the 6% PVC or less of opacifier and pigments in amounts ranging up to 8% PVC, a coating having a % PVC of 20 or more or 45 or less will fully hide the substrate at a wet applied thickness of from 350 to 800 μm.

With few exceptions, any emulsion polymer will dry to form a translucent film if used alone or with extenders, and extender pigments, in a below CPVC coating with substantially no opacifier.

In one embodiment, the coating compositions are formulated such that the ratio of the dry thickness of the applied coating to the wet thickness thereof ranges from 0.2:1 to 0.75:1. Accordingly, the self-inspecting aqueous coating compositions have a volume solids of from 20 to 70%.

The selection of the emulsion polymer itself is not critical and as long as it is any that provides a self-inspecting wet coating and a weatherable dry film, and can dry in use conditions.

Suitable emulsion polymers may include, for example, acrylic polymers and copolymers formed from (meth)acrylic ester monomers including $C_1$ to $C_{18}$ alkyl (meth)acrylates, such as methyl (meth)acrylate, ethyl (meth)acrylate, butyl (meth)acrylate, and 2-ethylhexyl (meth)acrylate, and (meth) acrylonitrile; polymers and copolymers made from styrene or substituted styrenes; polymers and copolymers made from butadiene; aqueous polyolefin dispersions; polymers made from vinyl monomers, such as vinyl acetate or other vinyl esters, or vinyl halides; and copolymers thereof. Styrene-acrylate copolymers can be used. Other suitable emulsion polymers may include aqueous dispersion polymers, such as polyurethane dispersions (PUD)s. Acrylic polymers are preferred for their weatherability.

Optionally, to improve their stability in water, the emulsion polymers can be made from 0.1 to 5 wt. %, based on the total weight of polymerizable monomers, of acid functional monomers, such as (meth)acrylic acid, and maleic acid, their anhydrides or salts.

Other suitable emulsion polymers may include copolymers of any of the above comprising up to 10 wt. %, based on the total weight of monomers, of auto-oxidizable monomers, such as acetoacetoxyl ethyl methacrylate (AAEM).

Preferably, the emulsion polymer enables an appropriate water vapor transmission rate to reduce any moisture condensation in the walls of a building substrate. Accordingly, the emulsion polymer should have a higher vapor transmission rate than the building substrate itself so that any moisture inside the weather-resistive barrier can diffuse to the exterior of the weather-resistive barrier. Vapor transmission rate (VTR) can be measured according to ASTM E-96 (1996) and expressed in units of perms, where higher perms correlate with a greater rate of water vapor transmission. For example, OSB has a VTR of 3 to 6 perms, so that the emulsion polymer should provide a weather resistive barrier with >6 perms. One skilled in the art of coating formulation can select emulsion polymers with a desired perm value by measuring candidate coating compositions according to ASTM E-96 and comparing it to the perm value of the building substrate. Alternatively, if a commercially available emulsion polymer is provided with perm data, the emulsion polymer can be properly matched to the building substrate.

Suitable emulsion polymers may include, for example, Rhoplex™ EC-2540, a flexible, acrylic polymer emulsion of Tg −10° C. and particle size of 350 nm from the Dow Chemical Company (Midland, Mich.). Such an emulsion polymer is useful without any further additives. Other suitable emulsion polymers include styrene-acrylics (e.g. Rhoplex™ 2019R from Dow or Acronal S-400 from BASF, Ludwigschafen, DE); ethylene-vinyl acetates, styrene-butadienes, and polyurethane dispersions, examples of which are described in U.S. Pat. No. 7,179,845 (Fomo Products Inc.); and Rovace™ 9100 acrylic-vinyl acetate copolymer, available from Dow Chemical, Midland Mich.

The coating made from such an emulsion polymer is applied until the substrate is no longer visible through the coating.

Suitable extenders may include any extender or filler that does not effectively hide a substrate when used in suitable amounts, i.e. act as an opacifier, such as, for example, calcium carbonate, silicas, silicates, talcs, nepheline syenite, quartz (ite), calcium carbonate, alumina, clays and, combinations thereof. Some extenders contribute to color, i.e. they are extender pigments, and are considered extenders so long as they do not effectively hiding a substrate when used as an extender. Preferred extenders are calcium carbonate and silicates.

Suitable pigments may include, for example, iron oxides or colorants, such as organic pigments or dyes phthalocyanines.

A suitable opacifier is titanium dioxide.

Extenders can be used in any concentration such that the wet coating has a total % PVC of from 0 to CPVC, or 10 to 50% PVC, or, preferably 20 to 45% PVC, or, more preferably, for applications at a 500 to 800 μm wet thickness, a 20 to 40% PVC.

Pigments may be used in amounts of up to 6% PVC, preferably up to 4% PVC, more preferably, up to 2% PVC.

Opacifiers may be used in amounts of up to 6% PVC, preferably up to 4% PVC, more preferably, up to 2% PVC.

The total amount of pigments plus opacifiers should not exceed 8% PVC and, preferably, should not exceed 4% PVC.

Colorants may be used in small amounts and are desirable, as the color becomes more pronounced on the drying of the weather-resistive barrier coating to enable better visibility outdoors where glare can be a problem.

Coating formulations may contain additional known ingredients used in a conventional manner, such as, for example, thickeners, such as polyvinyl alcohol (PVA), hydroxyethyl cellulose (HEC), associative thickeners, such as, for example, hydrophobically-modified, alkali soluble emulsions (HASE), hydrophobically-modified ethylene oxide-urethane polymers (HEUR), and hydrophobically-modified hydroxy ethyl cellulose (HMHEC), alkali-soluble or alkali-swellable emulsions (ASE), other cellulosic thickeners, and attapulgite clay; rheology modifiers; plasticizers; coalescing solvents, for example, 2,2,4-trimethyl-1,3-pentanediol monoisobutyrate, and glycol ethers; dispersants; wetting agents; dyes; sequestering agents; preservatives, biocides and mildewcides; anti-freeze agents; slip additives; waxes; freeze/thaw protectors; defoamers; corrosion inhibitors; and anti-flocculants. HEC is the preferred thickener.

A suitable self-inspecting coating composition is given in a Table 1, below.

TABLE 1

Sample Formulation

| Material | Parts by Weight |
|---|---|
| Water | 9.5 |
| Propylene Glycol | 0.67 |
| Tamol ™ 851[1] | 0.26 |
| Triton ™ X-405[2] | 3.4 |
| Foamaster ™ NXZ[3] | 0.15 |
| Emulsion polymer Rhoplex ™ EC 2540 | 37.14 |
| Begin Grind | |
| Snowhite ™ 12[4] | 47.91 |
| Foamaster NXZ | 0.15 |
| Colortrend ™ "F" 888-1045[5] | 0.12 |
| Aqueous Ammonia (28%) | 0.17 |
| Acrysol™ TT-615[6] thickener | 0.53 |
| Total | 100 |

[1]Sodium poly (methacrylic acid) dispersant (Dow Chemical, Midland, MI);
[2]Nonionic surfactant (Dow Chemical, Midland, MI);
[3]Defoamer (Cognis Corp., Cincinnati, OH);
[4]Calcium carbonate extender (Omya Canada Inc., Perth, Ontario, Canada);
[5]Red Iron Oxide pigment (Evonik Indistries, Parsippany, NJ);
[6]Acrylic alkali soluble emulsion polymer thickener (Dow Chemical, Midland, MI)

The above formulation was made on a 5000 g scale. The materials were added in order one at a time to a grind pot. Following addition of each material, the contents of the pot were briefly agitated by swirling. After the addition of Rhoplex™ EC-2540 the grind pot was transferred from the bench top and placed on the Cowles™ high speed disperser Morehouse Cowles, Chino, Calif. to mix and grind ingredients. Snowhite 12 calcium carbonate was slowly added to ensure good dispersion. Agitator speed was initially set to 1000 rpm and was increased with addition of the Snowhite 12 calcium carbonate to approximately 1300 rpm. Foamaster NXZ defoamer was added immediately following the Snowhite 12 calcium carbonate addition, and the grind was held for 5 minutes for full incorporation. Following the addition of the Acrysol™ TT-615 thickener the grind was held for 20 minutes. During this time the agitator speed was increased to between 2000-3000 rpm depending on conditions. Grind was filtered with 100 mesh and de-aired using a vacuum canister and agitator.

In the methods of the present invention, the aqueous coating compositions are applied to the substrate until the wet coating layer is opaque. If desired, a sample approximating the appearance of an opaque wet film can be compared to the substrate to aid the user in application. In general, more aqueous coating composition is applied where the compositions are lower in solids or lower in opacifier, pigment or extender content, where the emulsion polymer has a weight average particle size of below 100 nm.

The aqueous coating compositions can be applied to the substrate by any known method, such as by spraying, rolling, brushing or other known application methods.

In the methods of the present invention, drying comprises allowing to dry, optionally, with air drying.

In one embodiment, the methods of the present invention further comprise installing a decorative cladding over the coated sheathing. Such cladding can comprise aluminum or vinyl siding.

The methods of the present invention may further comprise, prior to applying the wet self-inspecting coating layer, applying, foamed aqueous emulsion polymer compositions to fill the gaps in a substrate, such as gaps between sheathing sheets, followed by drying the foam. Applying foam can comprise, for example, troweling or using a foam applicator.

Suitable foam compositions may comprise one or more aqueous emulsion polymer with a Tg less than 25° C., a surfactant, such as a nonionic surfactant, water, and a blowing agent, such as air or carbon dioxide, wherein a wet, freshly applied 12 mm thick and 50 mm wide bead of the foamed composition has the ability when dried to be compressed to a thickness of not more than 3 mm under a stress of no more than 0.035 MPa.

In one embodiment, the one or more emulsion polymer in the foam composition and in the self-inspecting coating composition can comprise the same one or more polymer.

The coated substrates of the present invention may be chosen from building sheathing, such as OSB, flooring, and masonry. Uses for such substrates may include coatings for sealing building sheathing and for below grade or basement walls. Thicker coatings, e.g. 150 μm or more, of rubbery polymer, such as styrene butadiene copolymer or rubbery acrylics such as butyl acrylate copolymers, are useful in below grade applications.

EXAMPLES

The following examples illustrate the present invention.

In the Examples 1 to 15 that follow, each of three emulsion polymers was formulated as shown in Table 1, below to make five coatings using calcium carbonate as an extender in the indicated % PVC. A 50% PVC coating was formulated first and then 25% PVC and 10% PVC extender formulations were prepared by diluting the 50% PVC coating with the indicated emulsion polymer to reach formulations indicated. One coating from each of the three emulsion polymers was formulated with 10% PVC titanium dioxide (opacifies), and one coating was formulated from each of the three emulsion polymers without any pigments or extenders to 0% PVC.

The materials used in the Examples were, as follows:
Acrylic: Butyl Acrylate/Methyl Methacrylate emulsion copolymer, 55% (w/w) solids, Tg (glass transition temperature) −40° C., weight average particle size of 350 nm;
SB: Styrene/butadiene emulsion copolymer, 51% (w/w) solids, Tg −26° C., weight average particle size of 150 nm;
VAc: Vinyl acetate emulsion polymer, 56% (w/w) solids, Tg 30° C., weight average particle size of 300 to 400 nm;
CaCO3: ground calcium carbonate, mean particle size 12 μm;
TiO2: titanium dioxide, mean particle size 275 nm, 76% (w/w) solids slurry in water;
Colorant: red iron oxide colorant paste, 69% (w/w) solids in water;
Thickener: hydrophobically-modified, alkali soluble acrylic emulsion (HASE), 28% (w/w) solids in water; and
Ammonia: 28% (w/w) aqueous solution Three films of each coating formulation of Examples 1 to 15 were made using a Garner draw down square set to 125, 625, and 1250 μm wet film thickness (WFT). The film thicknesses were designated to help establish a recommended coating thickness for later use is a self-inspecting coating. All three films of the same coating were drawn onto a single Leneta 28.5×43 cm spreading rate charts Form 12H with an alternating pattern black and white alternating diagonal stripes (The Leneta Co., Mahwah N.J.). The 125 μm draw down was performed first, followed by the 625 μm draw down, and lastly the 1250 μm draw down. Immediately following the last draw down a digital picture (not shown) was taken of the wet films on the chart using a Sony Super Steady Shot DSC—H2, at approximately 2 Megapixel resolution. The placement, lighting, and angle of each charts with respect to the camera was reproduced exactly for each photograph. The films were allowed to dry overnight (16 h) at ambient conditions prior to being photographed in their dry state, again using the exact same placement, lighting, and angle of each chart.

TABLE 2

Examples 1-15: Formulations

| Example | PVC extender/ opacifier | Acrylic (pbw) | CaCO3 (pbw) | TiO2 (pbw) | Colorant (pbw) | Ammonia (pbw) | Thickener (pbw) |
|---|---|---|---|---|---|---|---|
| 1 | 0/0 | 99.05 | — | — | 0.42 | 0.28 | 0.26 |
| 2 | 50/0 | 42.06 | 57.52 | — | 0.42 | — | — |
| 3 | 25/0* | 68.54* | 30.33* | — | 0.43* | 0.17* | 0.55* |
| 4 | 10/0* | 77.76* | 21.27* | — | 0.36* | 0.11* | 0.50* |
| 5 Comp | 0/10 | 76.61 | — | 22.45 | 0.42 | 0.23 | 0.29 |

| | | SB (pbw) | CaCO3 (pbw) | TiO2 (pbw) | Colorant (pbw) | Ammonia (pbw) | Thickener (pbw) |
|---|---|---|---|---|---|---|---|
| 6 | 0/0 | 99.58 | — | — | 0.42 | — | — |
| 7 | 50/0 | 43.97 | 55.62 | — | 0.42 | — | — |
| 8 | 25/0* | 69.50* | 29.37* | — | 0.42* | 0.19* | 0.17* |
| 9 | 10/0* | 79.05* | 20.34* | — | 0.36* | 0.11* | 0.14* |
| 10 Comp | 0/10 | 77.12 | — | 21.93 | 0.42 | 0.23 | 0.29 |

| | | VAc (pbw) | CaCO3 (pbw) | TiO2 (pbw) | Colorant (pbw) | Ammonia (pbw) | Thickener (pbw) |
|---|---|---|---|---|---|---|---|
| 11 | 0/0 | 99.58 | — | — | 0.42 | — | — |
| 12 | 50/0* | 43.97* | 55.62* | — | 0.42* | — | — |
| 13 | 25/0* | 69.75* | 29.45* | — | 0.42* | 0.22* | 0.17* |
| 14 | 10/0 | 79.33 | 20.13 | — | 0.36 | 0.07 | 0.11 |
| 15 Comp | 0/10 | 79.43 | — | 20.14 | 0.44 | 0.00 | 0.00 |

*calculated based on dilution, not actually weighed

Test Methods:

Hiding—Subjective: The wet and dry hiding provided by the films can be determined subjectively based on the visibility of the black and white stripes of the Leneta chart through the coating. Where the black and white substrate could not be distinguished, the coating fully hides the substrate and was called "opaque." If the stripes could be distinguished through the coating, the coating was rated "translucent".

Hiding—Objective: An objective numerical determination of hiding was made by measuring the RGB (red/green/blue) value of the digital photographs, using Adobe Photoshop (Adobe Systems Incorporated, San Jose, Calif.) software. For each photograph of each wet and dry coating, the RGB value was measured at 3 spots over white substrate, and 3 spots over black substrate, and the average value used. Each photograph was given a Delta value, where Delta is defined as the sum of the absolute value (magnitude) of the individual R, G, and B value differences over white and black substrates according to the following formula:

$$\text{Delta} = \|(R_{white} - R_{black})\| + \|(G_{white} - G_{black})\| + \|(B_{white} - B_{black})\|$$

A coating whose photograph had a Delta <12 hid the substrate, while a Delta >15 was translucent or transparent and allowed the substrate to be seen.

TABLE 3

Delta Values of Wet Film and Dry Film Coatings

| | Delta Wet film/Dry Film | | |
|---|---|---|---|
| Wet coating thickness (μm) Example | 125 | 625 | 1250 |
| 1 Acrylic 0% PVC extender | 236/356 | 4/76 | 1/19 |
| 2 Acrylic 50% PVC extender | 44/98 | 7/3 | 1/4 |
| 3 Acrylic 25% PVC extender | 91/243 | 9/26 | 3/5 |
| 4 Acrylic 10% PVC extender | 116/267 | 3/18 | 3/5 |

TABLE 3-continued

Delta Values of Wet Film and Dry Film Coatings

| | Delta Wet film/Dry Film | | |
|---|---|---|---|
| | 125 | 625 | 1250 |
| 5 Comp Acrylic 10% PVC Opacifier | 1/2 | 7/4 | 1/3 |
| 6 SB 0% PVC extender | 305/309 | 36/59 | 8/15 |
| 7 SB % 50 PVC extender | 147/182 | 5/18 | 4/6 |
| 8 SB % 25 PVC extender | 172/293 | 9/42 | 4/9 |
| 9 SB % 10 PVC extender | 81/375 | 23/72 | 6/16 |
| 10 Comp SB 10% PVC Opacifier | 2/3 | 8/2 | 3/5 |
| 11 VAc 0% PVC | 181/706 | 15/63 | 4/14 |
| 12 VAc 50% PVC extender | 77/53 | 3/11 | 3/7 |
| 13 VAc 25% PVC extender | 132/40 | 8/26 | 4/3 |
| 14 VAc 10% PVC extender | 168/251 | 5/89 | 5/19 |
| 15 Comp VAc 10% PVC Opacifier | 11/16 | 8/11 | 1/2 |

As shown in Table 3, above, in Comparative Examples 5, 10 and 15 having a 10% PVC opacifier content, all but the thinnest 125 μm vinyl acetate (VAc) emulsion polymer of the Comparative Example 15 coating actually hid the substrate at all thicknesses and failed to provide a see-through weather-resistive barrier. The Example 15 VAc 125 μm thick coating just barely meets the opaque wet/dry translucent standard. This shows that coatings with a 10% PVC of opacifier are not suitable for use in making the weather-resistive barrier of the present invention. Meanwhile, none of the Example 1 to 4, 6 to 9 and 11-14 125 μm thick wet coatings hid the substrate, thus, indicating that at this thickness the compositions would have to have some opacifier to work because the polymer and the extender are not hiding the substrate. Opacifiers can interfere with a see-through dry film except in small amounts, less than 6% PVC. For this reason, a 125 μm wet thickness coating application is not preferred.

Further, as shown in Table 3, above, the four acrylic 625 μm wet thickness coatings of Examples 1 to 4 provided wet hiding and yet dried to give a see through weather-resistive barrier. At 1250 μm, where any extender is present the acrylic coatings they hide both wet and dry. These Examples indicate that acrylic emulsion polymers having a 350 nm weight average particle size provide self-inspecting weather barrier coatings of the present invention at a 625 μm wet thickness.

Still further, as shown in Table 3, above, the styrene butadiene (SB) and VAc 625 μm wet thickness coatings of Examples 6 to 9 and 11 to 14 were generally successful in hiding the substrate when wet and drying to a see-through coating. The exception in the Example 12 VAc coating shows that a 50% PVC coating cannot be used for all polymers, even if it lacks any opacifier. The exception in Examples 6 and 9 for SB indicate that emulsion polymers having a weight average particle size of 150 nm are not preferred for hiding. Accordingly, except for the 50% PVC VAc and the 150 nm weight average particle size SB emulsion polymer coatings, a self-inspecting coating of these polymers should be applied at around 625 μm and the applicator should stop applying the coating at that thickness. In addition, the SB 150 nm weight average particle size coatings having 0 and 10% PVC (Examples 6 and 9) can be applied at a 1250 μm wet film to insure wet hiding drying to a see-through coating.

We claim:

1. A method of making a weather-resistive barrier film comprising applying a self-inspecting aqueous emulsion or dispersion polymer coating composition comprising one or more film-forming aqueous emulsion or dispersion polymer, less than 6% pigment volume concentration (% PVC) of one or more opacifier, one or more extender in amounts up to critical % pigment volume concentration (CPVC), and substantially no void, hollow core, or hollow sphere containing pigment to a building substrate until the substrate to which the coating composition has been applied is no longer visible to form a wet coating and drying to form the weather-resistive barrier.

2. The method as claimed in claim 1, further comprising applying a foamed aqueous composition of an emulsion or dispersion polymer with a Tg less than 25° C., a surfactant, water and a blowing agent to any gaps within the building substrate prior to applying the coating composition to the substrate.

3. The method as claimed in claim 1, wherein the coating composition consists essentially of the emulsion or dispersion polymer, extender and/or opacifier and up to 2% PVC of one or more colorant.

4. The method as claimed in claim 1, wherein in the coating composition the one or more opacifier is present in the amount of 4% PVC or less.

5. The method as claimed in claim 1, wherein the coating composition gives a coating having a total % PVC of up to 45% PVC.

6. The method as claimed in claim 1, wherein the emulsion or dispersion polymer has a weight average particle size of from 20 to 500 nm, wherein when the emulsion or dispersion polymer has a weight average particle size of 100 nm or less, the composition has a % pigment volume concentration (% PVC) of 10 to 50.

7. The method as claimed in claim 1, wherein the emulsion or dispersion polymer has a weight average particle size of 160 nm or more.

8. The method as claimed in claim 1, wherein the wet coating comprises an opaque film when the film has a thickness ranging from 100 μm to 1800 μm.

9. The method as claimed in claim 1, wherein the building substrate is chosen from wood sheathing, gypsum sheathing, cement sheathing, foam sheathing, masonry, wood roofing, flooring and subflooring.

* * * * *